(12) United States Patent
Rebeske

(10) Patent No.: US 6,295,038 B1
(45) Date of Patent: *Sep. 25, 2001

(54) LAPTOP COMPUTER

(76) Inventor: Carlton S. Rebeske, 1646 N. Jones Cir., Mesa, AZ (US) 85203

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,116

(22) Filed: Apr. 16, 1998

(51) Int. Cl.[7] ................................................. G09G 3/00
(52) U.S. Cl. .............................................. 345/1; 361/681
(58) Field of Search .................................. 345/1, 5, 102; 361/681

(56) References Cited

U.S. PATENT DOCUMENTS

| 4,243,986 | 1/1981 | Nixon | 340/756 |
|---|---|---|---|
| 4,749,364 | 6/1988 | Arney et al. | 439/372 |
| 5,038,301 | 8/1991 | Thoma, III | 364/521 |
| 5,115,229 | 5/1992 | Shalit | 340/716 |
| 5,307,055 | 4/1994 | Baskin et al. | 345/1 |
| 5,335,192 | 8/1994 | Oshiba | 364/708 |
| 5,384,579 | 1/1995 | Nakasuji et al. | 345/123 |
| 5,537,127 | 7/1996 | Jingu | 345/1 |
| 5,539,658 * | 7/1996 | McCullough | 364/514 A |
| 5,568,603 | 10/1996 | Chen et al. | 395/155 |
| 5,590,021 | 12/1996 | Register | 361/681 |
| 5,659,361 | 8/1997 | Jin | 348/75 |
| 5,856,819 * | 1/1999 | Vossler | 345/102 |

FOREIGN PATENT DOCUMENTS 8-54962 * 2/1996 (JP) ................................ G06F/1/16

* cited by examiner

*Primary Examiner*—Steven Saras
*Assistant Examiner*—William C. Spencer
(74) *Attorney, Agent, or Firm*—Schmeiser, Olsen & Watts

(57) ABSTRACT

A laptop computer is constructed having a case including a keyboard and containing traditional computer components. A display screen is hingedly secured to the computer case and may be pivoted about the hinge to an operative position wherein an operator can observe the information displayed on the display screen. A second display screen is hingedly secured to the first display screen and is also connected to the computer components within the computer case. The second display screen, when hinged to its operative position displays the same information displayed on the first display screen, but is directed in an opposite direction to permit an operator and an observer to observe the same information viewable on the first and second display screens, respectively.

8 Claims, 4 Drawing Sheets

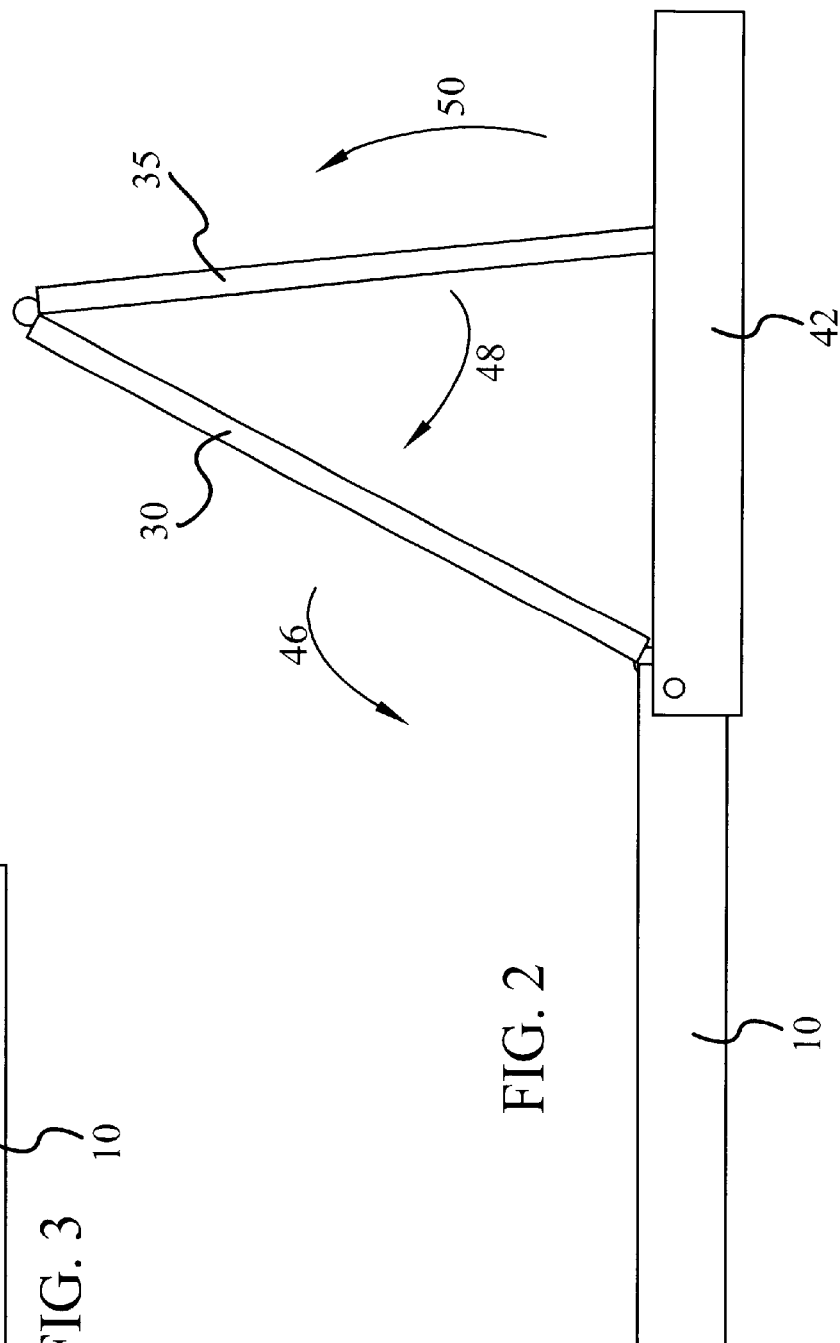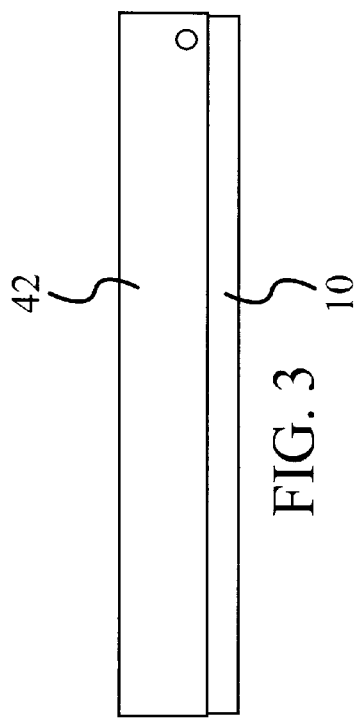

LAPTOP COMPUTER

FIELD OF THE INVENTION

The present invention relates to laptop computers, and more particularly to portable computers for use in the presentation of information to selected observers in addition to the operator of the computer.

BACKGROUND OF THE INVENTION

Computers, particularly laptop computers, in combination with selected peripheral equipment have been designed in the past for utilization by the computer operators to make presentations to groups of observers such as pupils and the like. The techniques utilized when operating such computers are intended for the presentation of selected materials, viewable by the operator on the computer display screen, to several individuals or groups on secondary or supplemental display screens that are large enough for the entire group to observe. Such techniques are common for the presentation of materials in seminars, sales meetings, or similar gatherings wherein it is the intention of the computer operator to display the information available to him on the display screen to a group.

Such computers, and the implementing software together with the necessary peripheral equipment are usually relatively bulky and very expensive. Further, such apparatus and presentation techniques are inappropriate when the presentation is to be made to only one or two observers in addition to the operator. For example, when an operator wishes to display the contents of his computer display screen to another person or observer seated at the same table, it is necessary for the observer to either look over the operator's shoulder or to sit adjacent to the operator so that both individuals may share the same view of the display screen This situation is not entirely acceptable in most sales-type presentations wherein the operator and the observer are not working together or are in an relationship of salesperson/ prospective purchaser.

OBJECTS OF THE INVENTION

It is therefore an object of the present invention to provide a laptop computer system for use in the presentation of information to observers in addition to the operator of the computer.

It is a further object of the present invention to provide a laptop computer having a duplicate display positioned to permit both an operator and an observer to simultaneously view the same information while seated in a conventional opposing position at a common table or desk.

It is still another object of the present invention to provide a laptop computer incorporating a duplicate display constructed to permit the positioning of the displays in opposite directions to thereby permit simultaneous viewing of the displayed information by the operator and observer.

These and other objects of the present invention will become apparent to those skilled in the art as the description thereof proceeds.

BRIEF DESCRIPTION OF THE DRAWINGS

FIG. 2 is a side elevation of the laptop computer of FIG. 1.

FIG. 3 is a side elevation of the laptop computer of FIGS. 1 and 2 shown in its collapsed carrying position.

DETAILED DESCRIPTION OF THE PREFERRED EMBODIMENTS

Figure 1:
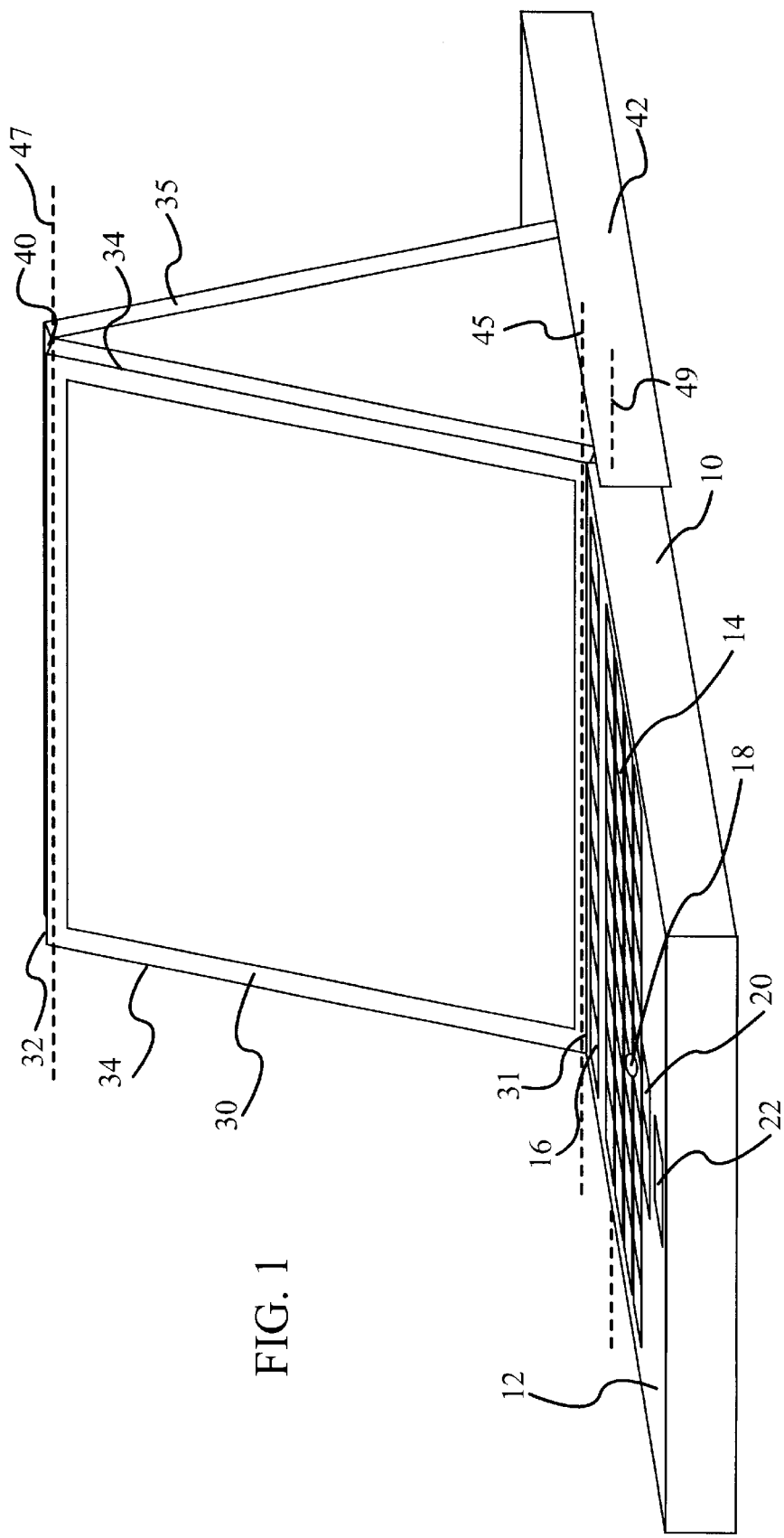
FIG. 1 is a perspective view of a laptop computer constructed in accordance with the teachings of the present invention.

Referring now to FIGS. 1 and 2, a perspective view of a laptop computer constructed in accordance with the teachings of the present invention is shown. The computer includes a case 10 enclosing the usual portable computer components such as processors, memories, including RAM, and hard disk, floppy disk drives, modem cards and similar components presently available in conventional laptop computers. Laptop computers are portable, usually selfpowerable computers, having usual desktop computer functions, but in lightweight compact form to facilitate carrying.

The laptop computer of FIG. 1 includes a keyboard 12 providing the usual alpha-numeric and command data entry keys 14 as well as function keys 16 and provision for a mouse or its equivalent such as an "eraser pointer" 18 with the right 20 and left mouse 22 button keys. In the conventional prior art laptop computer, a display screen is hinged to the computer case and may be folded into a storage position such that the display covers the keyboard to thus close the laptop computer to protect both the display and the keyboard for transport. In the present invention, a similar display screen 30 is hinged to the case of the laptop and is connected to the computer components within the case to provide a means for displaying information to the operator. The display screen 30 may form any of the well known monitor or display types but is usually of the liquid crystal type in view of the compact construction provided by such structure. The display screen 30 is rectangular and includes a bottom edge and a top edge 31 and 32, respectively, connected by side edges 34.

In the laptop of the present invention a second display screen 35 is hinged to the first display along the top edges thereof. That is, the first display is hinged along its bottom edge 31 to the computer case 10 while the first display's top edge 32 is hingedly secured to the top edge 40 of the second display screen 35. When the laptop of the present invention is opened for use and is in its operative position as shown in FIGS. 1 and 2, the operator faces the first display screen 30 in the conventional manner and operates the keyboards in accordance with the usual techniques for entering and retrieving information to and from the computer. The information displayed on the display screen 30 is readily available to the operator; however, since the display screen is usually small to provide the necessary lightweight and portability of the laptop, it is difficult when making a presentation to be discussing the contents of the display screen information with an observer if the observer or observers have to look over the shoulder or crowd next to the operator to view the display screen. Thus, the second display screen 35 is connected to the computer components within the computer case 10 in a manner similar to the first display screen wherein the information on the second display screen 35 is identical to that contained in the first display screen 30. Thus, when certain information is entered on the keyboard or is called up from memory to be displayed on the first display screen 30, that same information is also simultaneously displayed on the second display screen 35. Similarly, when a pointer or cursor (not shown) on the first display screen is moved, such as by the use of a mouse or the "eraser pointer" 18, to point to a particular portion of the information on the first display screen 30, that same pointer is viewed on the second display screen 35 for the observer.

This duplicate information on the second display screen permits the operator and the observer to sit across a table or desk and discuss the information presented on the display screens while the presentation is being controlled by the operator. It is a relatively easy matter to provide software programming that may permit the operator to exclude certain non-essential display matters on the second display screen while leaving those display matters on the first display screen. For example, when describing a document that is being displayed on the display screen, the operator may not want to permit such non-essential information as toolbars, display options, or program information to be displayed on the second display screen that would confuse the observer when reading or interpreting the information on the document being disclosed or displayed on the second display screen. It is also advantageous when using the laptop of the present invention for the operator to emphasize a particular portion of the information or document being displayed to the observer by simply highlighting or underlining that information as the observer is watching on his display screen; the underlined or highlighted information occurring on the first screen as a result of the operator's actions is therefore automatically presented to the observer by the second screen. This feature enables the operator to simultaneously emphasize certain portions of the information or document to the observer while discussing the matter with the observer.

When the presentation has concluded, the first display screen 30 is folded or pivoted about a hinge axis 45 as indicated by arrow 46 in a manner identical to that of a conventional laptop; however, the second display screen 35 is folded back-to-back about a hinge axis 47 as indicated by arrow 48 connecting the two display screens along the top edges thereof. A protective top 42 is hinged to the case that can then be pivoted about its own hinge axis 49 as indicated by arrow 50 to a closed position such as shown in FIG. 3 wherein both screens or displays are protected and the laptop is ready to be transported.

With the laptop construction of the present invention, the information on the display screen presented to the observer by the operator is the same as the operator's display screen; however, although the information is substantially the same, the information can be highlighted, restricted, or otherwise modified to assist the operator in making the presentation to the observer. The second display screen is hinged to the first display screen, although it may be connected in another manner or detachable; however, the second display screen is substantially the same size or smaller than the first display screen and is connected to the computer components contained within the case of the laptop computer.

Figure 4:
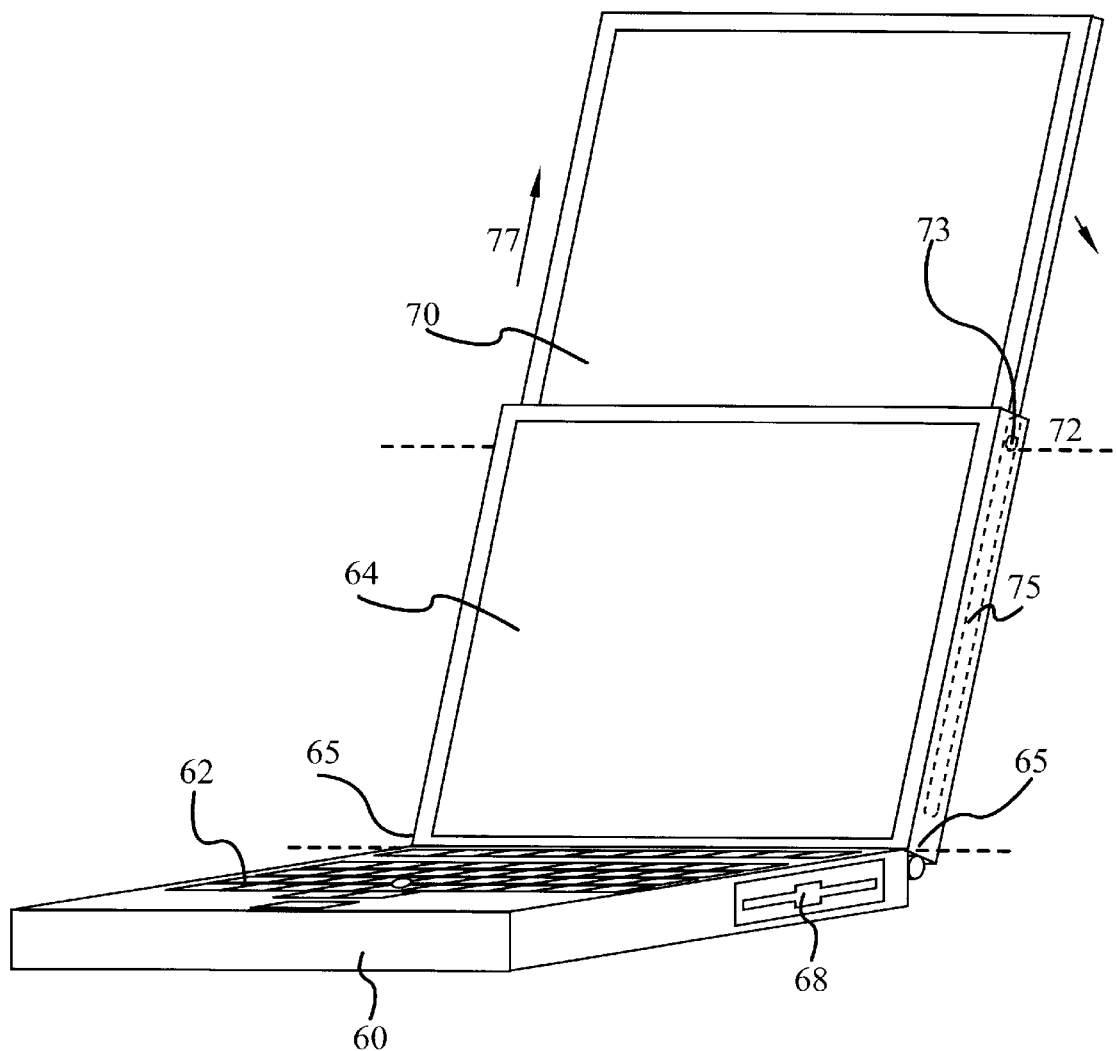
FIG. 4 is a perspective view of an alternative embodiment of a laptop computer constructed in accordance with the teachings of the present invention.
Figure 5:
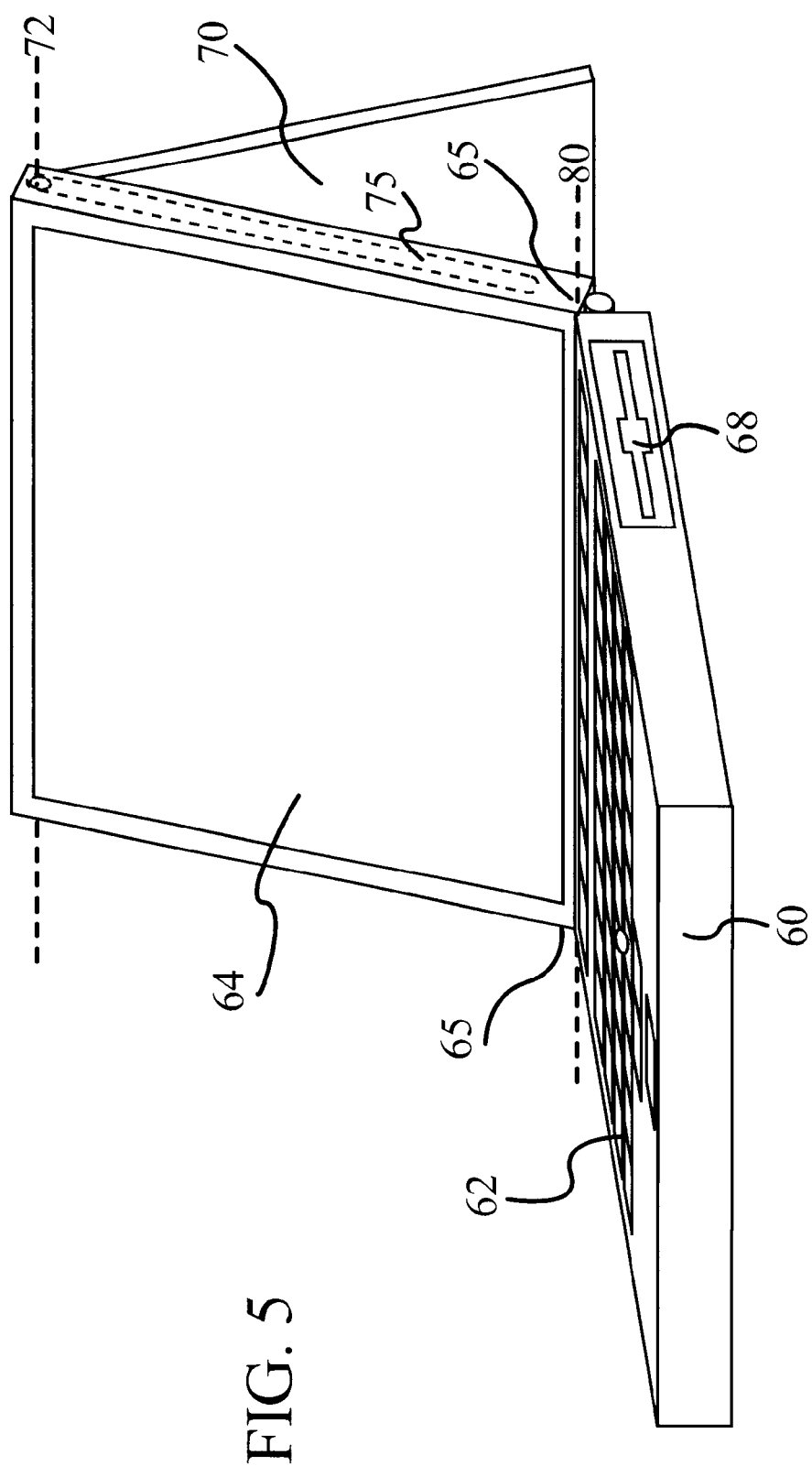
FIG. 5 is a perspective view of the laptop computer of FIG. 4 showing the second display screen hinged to its operative position.

Referring now to FIGS. 4 and 5, an alternative embodiment of the laptop computer of the present invention is shown. A computer case 60 is shown and incorporates the usual keyboard 62 in a manner similar to that described in connection with FIGS. 1 through 3. The case 60 encloses the usual portable computer components which are appropriately connected to a first display screen 64 which is hingedly secured to the case through hinges 65 in a manner well known in the art. Entries made through the utilization of the keyboard 62 may result in the display of information on the first display screen 64, either by directly displaying the entered information or calling information from memory facilities located within the case 60 or through a removable disk that may be inserted in slot 68 provided therefor in the side of the case 60.

A second display screen 64 is mounted for pivotal movement about axis 72. The hinge axis 72 extends from the axis of small rollers 73 attached to the second display screen 70; the rollers 73 are guided by channels 75 provided in the sides of the first display screen 64. The rollers, attached to the second display screen 70, may thus follow the channels 75 to permit the second display screen 70 to slide relative to the first display screen 64 in a direction indicated by the arrow 77. Thus, the second display screen may be extended in the direction indicated by arrow 77 such that it assumes the position shown in FIG. 4; the second display screen 70 may then be pivoted about the axis 72 to thereby assume the position shown in FIG. 5 wherein the second display screen 70 faces away from the operator of the computer and faces toward an observer positioned facing the operator.

In a manner similar to that described in connection with FIGS. 1 through 3, the embodiment shown in FIGS. 4 and 5 provides a means for an operator to enter and present information to himself on a first display screen while simultaneously displaying that information to an observer on the second display screen. The duplicate information on the second display screen 70 permits the operator and the observer to sit across a table or desk and review and discuss the information presented on the display screens while the information being displayed (and perhaps being emphasized by underlining or highlighting) is being controlled by the operator.

When the presentation is completed, the laptop computer is turned off in the conventional manner and the second display screen pivoted about the axis 72 to align it in a parallel plane with the first display screen 64. The second display screen 70 is then moved downwardly in a direction opposite to that shown by the arrow 77 to thereby "stack" the two screens one on top of the other with the second display screen 70 facing the back of the first display screen 64. The two screens may then be pivoted about the axis 80 to close the laptop computer with both display screens covered and protected.

The laptop computer of the present invention may easily be provided with a control switch, either through the utilization of a hardware switch or through software programming, wherein the second display screen can be turned off to permit the laptop computer of the present invention to be used in the conventional manner similar to prior art laptop computers having single screens. The second display screen may be provided with a disconnectable hinge or connection to the first display screen such that the second display screen may be positioned more conveniently for an observer; however, it is important that the electrical connection be maintained to the computer components within the computer case.

The present invention has been described in terms of a specific embodiment incorporating details to facilitate the understanding of the principles of construction and operation of the invention. Such reference to the described embodiment and details thereof is not intended to limit the scope of the claims appended hereto. It will be apparent to those skilled in the art that modifications may be made in the embodiment chosen for illustration without departing from the spirit and scope of the invention.

What is claimed is:

1. A laptop computer comprising:

(a) a computer case including a keyboard and containing computer components;

(b) a first display screen hingedly secured to said case and connected to said computer components for displaying information, when in an operative position, to an operator positioned at said keyboard; and (c) a second display screen, substantially the same size as said first display screen, connected to said computer components for displaying said information, when in an operative position, said second display screen being slidably and rotatably connected to said first display screen such that said second display screen is adjustable between a first position in which said second display screen is behind said first display screen and facing substantially in said first direction, and a second position in which said second display screen is facing in a second direction between 90° and 180° from said first direction such that in said second position an operator at said keyboard may view said first display screen and an observer, facing said operator, may simultaneously view said second display screen.

2. The combination set forth in claim 1 including a single protective cover hingedly secured to said computer case for enclosing and protecting said first and second display screens when not in use.

3. A laptop computer comprising:

(a) a computer case including a keyboard and containing computer components;

(b) a first display screen facing a first direction, said first display screen having a rectangular shape and having a bottom and tope edge joined by side edges, said first display screen hingedly secured to said case along said bottom edge and connected to said computer components for displaying information to an operator positioned at said keyboard;

(c) a second display screen having a rectangular shape with bottom and top edges joined by side edges, said second display screen hingedly secured to said first display screen at the top edges of said display screens and movably secured to said first display screen such that said second display screen is adjustable between a first position wherein said top edge of said second display screen is adjacent said bottom edge of said first display screen and said second display screen is behind said first display screen and facing substantially in said first direction, and a second position in which said top edge of said second display screen is adjacent said top edge of said first display screen and said second display screen is facing in a second direction between 90° and 180° from said first direction such that in said second position an operator at said keyboard may view said first display screen and an observer, facing said operator, may simultaneously view said second display screen, said first and second display screens displaying substantially the same information.

4. The combination set forth in claim 3 wherein said first display screen includes channels extending along its side edges and including means connected to said second display screen for movably extending along said channels to thereby permit the first and second display screens to be moved relative to each other.

5. A laptop computer comprising:

(a) a case including a keyboard and at least partially containing computer components;

(b) a first display screen hingedly secured to said case at a first edge of said first display screen, operably coupled to said computer components, and configured to display information when in an operative position, the first display screen having:
1) a second edge substantially parallel to said first edge and joined thereto by first and second sides having lengths; and
2) a channel extending a majority of said length of each of said first and second sides;

(c) a second display screen operably coupled to said computer components and configured to display at least a portion of said information displayed on said first display screen when in an operative position, the second display screen having:
1) a display surface;
2) first a second roller each extending adjacent said first edge from said first and second sides, respectively, said first and second rollers each being slidably and rotatably associated with an operatively associated channel of said first display screen such that said second display screen is adjustable between a first position with an angle of approximately 180° between the first and second display screens, and a second position with an angle of between approximately 225° and 360° between the first and second display screens such that in said second position an operator at said keyboard may view said first display screen and an observer, facing said operator, may simultaneously view said second display screen.

6. The laptop computer of claim 5, further including a single protective cover hingedly secured to said case enclosing and protecting said first and second display screens when not in use.

7. The laptop computer of claim 5, wherein said second display screen is configured to display less than all of said information displayed on said first display screen.

8. The laptop computer of claim 5, wherein said second display screen is configured to display only information selected by an operator of said laptop computer.

* * * * *